US012149002B2

(12) United States Patent
Chen et al.

(10) Patent No.: US 12,149,002 B2
(45) Date of Patent: Nov. 19, 2024

(54) ANTENNA ARRAY, FPC AND ELECTRONIC DEVICE

(71) Applicant: HuiZhou TCL Mobile Communication Co., Ltd., Guangdong (CN)

(72) Inventors: Wei Chen, Guangdong (CN); Song Bai, Guangdong (CN); Zhiwei Chen, Guangdong (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 231 days.

(21) Appl. No.: 17/617,586

(22) PCT Filed: Dec. 19, 2019

(86) PCT No.: PCT/CN2019/126462
§ 371 (c)(1),
(2) Date: Dec. 9, 2021

(87) PCT Pub. No.: WO2021/114340
PCT Pub. Date: Jun. 17, 2021

(65) Prior Publication Data

US 2022/0247092 A1 Aug. 4, 2022

(30) Foreign Application Priority Data

Dec. 13, 2019 (CN) ........................ 201911285900.4

(51) Int. Cl.
*H01Q 21/30* (2006.01)
*H01Q 1/24* (2006.01)

(52) U.S. Cl.
CPC ............ *H01Q 21/30* (2013.01); *H01Q 1/241* (2013.01)

(58) Field of Classification Search
CPC ............................... H01Q 21/30; H01Q 1/241
See application file for complete search history.

(56) References Cited

U.S. PATENT DOCUMENTS

2012/0119955 A1 5/2012 Milosavljevic et al.
2014/0204846 A1 * 7/2014 Maltsev .............. H04W 92/045 370/329

(Continued)

FOREIGN PATENT DOCUMENTS

CN 101971418 2/2011
CN 102017291 4/2011

(Continued)

OTHER PUBLICATIONS

International Search Report and the Written Opinion Dated Sep. 16, 2020 From the International Searching Authority Re. Application No. PCT/CN2019/126462 and Its Translation of Search Report Into English. (8 Pages).

(Continued)

*Primary Examiner* — Dieu Hien T Duong

(57) ABSTRACT

An antenna array, comprising: an antenna feed point, a first antenna wiring, a second antenna wiring and a filter, wherein the first antenna wiring is connected to the second antenna wiring by means of the filter; the antenna feed point is connected to the first antenna wiring; the filter is located within a predetermined range from the antenna feed point; the working frequency band of the first antenna wiring is a first frequency band; the working frequency band of the second antenna wiring is a second frequency band; and the filter is used for filtering out a third frequency band from the first frequency band, such that the second frequency band passes.

20 Claims, 3 Drawing Sheets

(56) References Cited

U.S. PATENT DOCUMENTS

| | | | | |
|---|---|---|---|---|
| 2015/0002347 | A1 | 1/2015 | Jeong | |
| 2017/0214136 | A1* | 7/2017 | Irci | H01Q 1/243 |
| 2019/0020121 | A1* | 1/2019 | Paulotto | H01Q 21/28 |
| 2021/0119336 | A1 | 4/2021 | Sun et al. | |

FOREIGN PATENT DOCUMENTS

| | | | | |
|---|---|---|---|---|
| CN | 202111228 | | 1/2012 | |
| CN | 203103497 | | 7/2013 | |
| CN | 106329080 | | 7/2017 | |
| CN | 109037952 | | 12/2018 | |
| CN | 109273830 | A * | 1/2019 | H01Q 1/22 |
| CN | 110034393 | | 7/2019 | |
| CN | 209169377 | | 7/2019 | |
| EP | 2819242 | | 12/2014 | |
| WO | WO 2009/134198 | | 11/2009 | |
| WO | WO 2019/127060 | | 7/2019 | |

OTHER PUBLICATIONS

Notification of Office Action and Search Report Dated Sep. 2, 2020 From the State Intellectual Property Office of the People's Republic of China Re. Application No. 201911285900.4 and Its Translation of Office Action Into English. (12 Pages).

Notification of Office Action and Search Report Dated Mar. 26, 2021 From the State Intellectual Property Office of the People's Republic of China Re. Application No. 201911285900.4 and Its Translation of Office Action Into English. (20 Pages).

* cited by examiner

ANTENNA ARRAY, FPC AND ELECTRONIC DEVICE

RELATED APPLICATIONS

This application is a National Phase of PCT Patent Application No. PCT/CN2019/126462 having International filing date of Dec. 19, 2019, which claims the benefit of priority of Chinese Patent Application No. 201911285900.4 filed on Dec. 13, 2019. The contents of the above applications are all incorporated by reference as if fully set forth herein in their entirety.

FIELD AND BACKGROUND OF THE INVENTION

The present invention relates to an antenna technology, and more particularly, to an antenna array, flexible printed circuit (FPC) and an electronic equipment.

An antenna, working as a sensing unit, becomes more and more important in a mobile communication system. Because there are interferences across different frequency bands, in a conventional network, the 5G system may introduce huge interferences on the 4G system or the 3G system or the 4G system or 3G system may introduce huge interferences on the 5G system. In a conventional art, the antenna in the electronic equipment cannot support two frequency bands.

SUMMARY OF THE INVENTION

One objective of an embodiment of the present invention is to provide an antenna array, an FPC and an electronic equipment, to solve the above-mentioned issue where an antenna cannot support multiple frequency bands.

In a first aspect, an embodiment of the present invention proposes an antenna array.

The antenna array comprises: an antenna feed point (1), a filter (4) located within a predetermined distance range from the antenna feed point (1), a first antenna wire (2) electrically connected to the antenna feed point (1), and a second antenna wire (3) electrically connected to the first antenna wire (2) through the filter (4).

A working frequency band of the first antenna wire (2) is a first frequency band. A working frequency band of the first antenna wire (2) is a second frequency band; the filter (4) is configured to filter out a third frequency band from the first frequency band and allow the second frequency band to pass through the filter (4).

Optionally, the filter (4) is a low-pass filter (5) or a high-pass filter (6).

Optionally, the antenna array further comprises an antenna resonator (7), electrically connected to the second antenna wire (3). The first frequency band comprises the second frequency band, the filter (4) is the low-pass filter, and the second frequency band is lower than the third frequency band.

Optionally, the second frequency band is a 4G frequency band and the third frequency band is a 5G frequency band.

Optionally, the antenna array further comprises an antenna resonator (7'), electrically connected to the second antenna wire (3). The first frequency band comprises the second frequency band, the filter (4) is the high-pass filter, and the second frequency band is higher than the third frequency band.

Optionally, the second frequency band is a 5G frequency band and the third frequency band is a 4G frequency band.

Optionally, a type of the first antenna wire (2) and the second antenna wire (3) comprises:

a monopole antenna, an inverted-F antenna, a printed inverted-F antenna, or a loop antenna.

Optionally, the antenna array is arranged to lead a narrow wave beam to a height or a position.

In a second aspect, an embodiment of the present invention proposes a flexible printed circuit comprising an antenna array as disclosed in the first aspect of the present disclosure.

In a third aspect, an embodiment of the present invention proposes an electronic equipment comprising an antenna array as disclosed in the first aspect of the present disclosure.

Optionally, the electronic equipment is a mobile terminal or a base station.

Optionally, the electronic equipment is a mobile terminal and the antenna array is placed on a top, a bottom or right/left sides of the mobile terminal.

According to an embodiment, an antenna array, an FPC and an electronic equipment are disclosed. The antenna array comprises an antenna feed point, a filter located within a predetermined distance range from the antenna feed point, a first antenna wire electrically connected to the antenna feed point, and a second antenna wire electrically connected to the first antenna wire through the filter. A working frequency band of the first antenna wire is a first frequency band. A working frequency band of the first antenna wire is a second frequency band; the filter is configured to filter out a third frequency band from the first frequency band and allow the second frequency band to pass through the filter. Take 4G and 5G composite antenna as an example, a filter is further included on the basis of the conventional 4G antenna array on the conventional FPC board. This makes the antenna structure condensed, simplifies the manufacturing process, raises the yield and reduces the cost of manufacturing an FPC antenna. Accordingly, it could meet the demands for supporting two different frequency bands without largely changing the 4G antenna array and thus solves the issue, where a conventional antenna cannot support multiple frequency bands. It also avoids mutual interferences introduced by the 4G antenna wire and the 5G antenna wire. Furthermore, it could be widely used in an electronic equipment having limited inner space and thus could be widely promoted and applied in corresponding electronic equipments. Therefore, it could ease the transition from 4G to 5G.

REFERENCE SIGN

11: cell; 12: base station; 13: mobile terminal; 14: satellite positioning system; 15: MSC; 16: PSTN; 17: router.

1: antenna feed point; 2: first antenna wire; 3: second antenna wire; 4: filter.

5: low-pass filter; 6: high-pass filter.

7: antenna resonator.

7': antenna resonator.

DESCRIPTION OF SPECIFIC EMBODIMENTS OF THE INVENTION

Specifically, the terminologies in the embodiments of the present invention are merely for describing the purpose of the certain embodiment, but not to limit the invention. Examples and the appended claims be implemented in the present invention requires the use of the singular form of the book "an", "the" and "the" are intended to include most forms unless the context clearly dictates otherwise. It should also be understood that the terminology used herein that "and/or" means and includes any or all possible combinations of one or more of the associated listed items.

Figure 1:
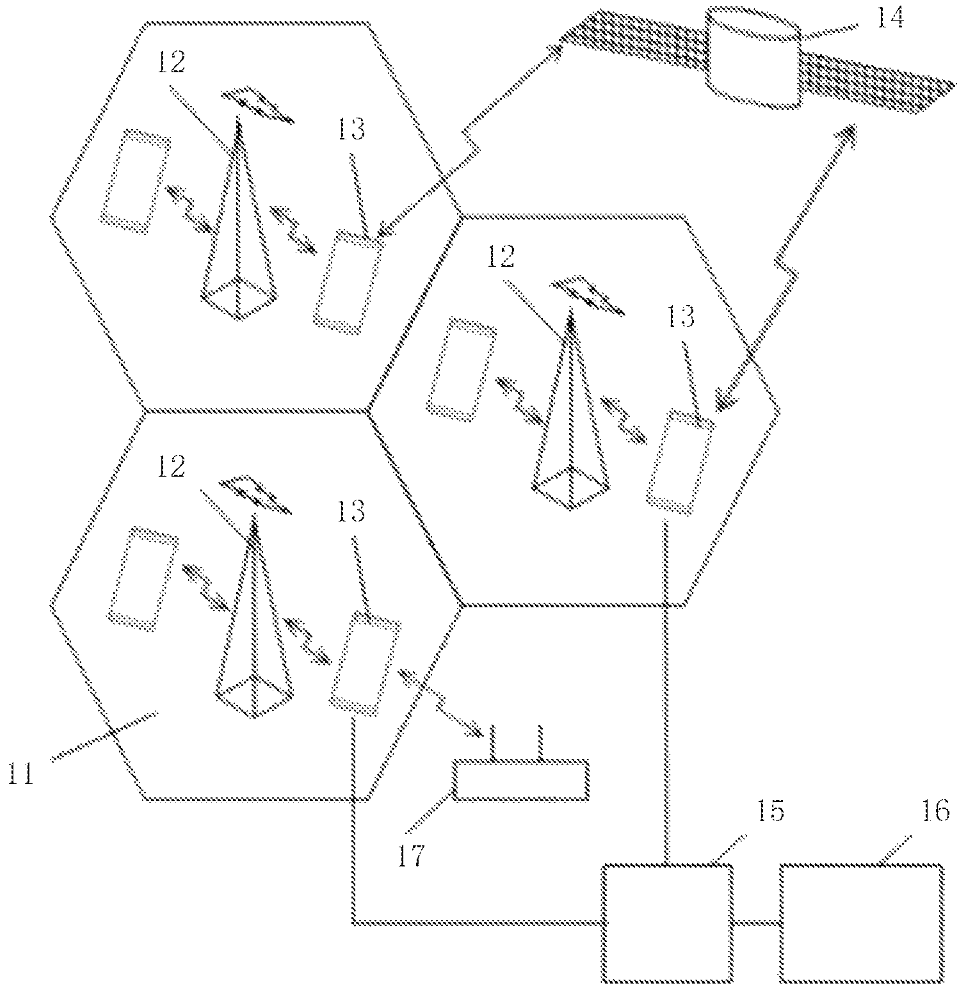
FIG. 1 is a diagram of a wireless communication network according to an embodiment of the present invention.

Please refer to FIG. 1. FIG. 1 is a diagram of a wireless communication network according to an embodiment of the present invention. The network could comprise a plurality of cells 11. Each of the cells 11 comprises a base station 12 and a mobile terminal 13. The network could adopt all kinds of communication protocols or standards to proceed with audio communications or data communications. The mobile terminal 13 could communicate in the network. At the same time, the mobile terminal 13 could communicate with satellite positioning system 14 (such as global positioning system, GPS), BeiDou Navigation Satellite System (BDS), or global navigation satellite system (GLONASS). The mobile terminal 13 could communicate with a mobile telephone switching center (MSC) 15, a public switched telephone network (PSTN) 16 or any other mobile terminal through the MSC or PSTN. Furthermore, the mobile terminal 13 could exchange data with a router 17. The base station 12 could communicate with the mobile terminal 13 through a specific channel.

Because the 5G system comprises new wireless transmission technology and some evolved wireless radio access technologies, this means that 5G system is a multi-system-coexisting heterogeneous network, which combines multiple radio access technologies (such as 5G, 4G, universal mobile telecommunication system (UMTS)) with Wi-Fi. Especially, it needs to achieve the complex usage of antennas for different generations of communication systems.

Figure 2:
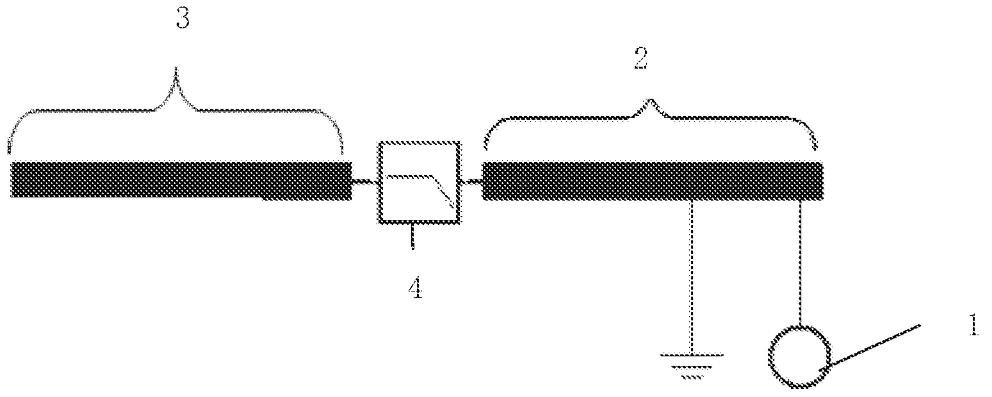
FIG. 2 is a diagram of an antenna array according to an embodiment of the present invention.

Accordingly, an antenna array shown in FIG. 2 is disclosed according to an embodiment of the present invention. The antenna array could be used in a personal computer, a desktop computer, a mobile terminal, a laptop, a notebook, a tablet, a server, a portable computer, a portable equipment, a personal digital assistant, a portable PDA, an in-vehicle equipment, a mobile/portable equipment a base station or any other electronic equipment having wireless communication functions. The antenna could comprise one or more antenna elements, components, units, parts and/or any other arrangement, structure, and/or distribution in an array. In some embodiments, the antenna could use independent transmitter antenna unit and receiver antenna unit to perform a transmitting and receiving functions. In some embodiments, the antenna could use common and/or integrated transmitter/receiver units to perform the transmitting and receiving functions. The antenna could comprise a phased array antenna, a single-element antenna, a beam antenna, and/or any similar type of antenna.

Please note, the technical features or components disclosed in the following embodiments could be combined with each other as long as the combination will not result in any serious conflict.

Please refer to FIG. 2. FIG. 2 is a diagram of an antenna array according to an embodiment of the present invention. The antenna array comprises an antenna feed point 1, a first antenna wire 2, a second antenna wire 3, and filter 4. The first antenna wire 2 and the second antenna wire 3 are electrically connected to each other through the filter 4. The first antenna wire 2 and the second antenna wire 3 could be designed as a wire starting from the feed point without any branch. In another embodiment, the filter could be directly welded on the antenna FPC. This manufacturing method is simpler and intrudes less loss in contrast to being welded on a PCB.

The antenna feed point 1 is electorally connected to the first antenna wire 2. The filter 4 is located within a predetermined distance range from the antenna feed point 1. In an embodiment, the filter is located at a position distanced 10-15 mm away from the antenna feed point 1. A POSITA could understand the above parameters may vary according to the structure of the antenna array. That is, the parameters could be determined according to the wire length required for resonant response. These changes all fall within the scope of the present invention.

The working frequency band of the first antenna wire 2 is a first frequency band and the working frequency band of the second antenna wire 3 is a second frequency band. The filter 4 is used to filter out a third frequency band from the first frequency band such that the second frequency band could pass through the filter 4. The first antenna wire 2 and the second antenna wire 3 are diversity antennas. In the actual implementation, the electronic equipment may have to meet the demands for one of 2G-5G communication protocols, GPS or Wi-Fi. In this embodiment, the antennas for transmitting 2G-5G signals are regarded as antennas of the same protocol, which could be called diversity antennas. The antennas for transmitting GPS signals or Wi-Fi signals are regarded as antennas of another protocol, which could be called ancillary antennas.

The filter could select frequency band. This means that the filter could only allow a specific frequency component of a signal to pass through the filter and the other portions of the signal are attenuated. In this embodiment, the filter could filter out the interference noises or perform the frequency spectrum analysis. Take 4G/5G composite antenna as an example. In this embodiment, the filter could be directly added on the conventional 4G antenna on the FPC board. Accordingly, the antenna structure is compact, the manufacturing process is simple, and the yield could be higher and thus the cost of manufacturing the FPC antenna is reduced. This could meet the demands for supporting two different frequency bands without significant change of the 4G antenna array and thus could solve the aforementioned issue where the conventional antenna cannot support two different frequency bands. Furthermore, it prevents the interferences between the 4G antenna wire and the 5G antenna wire, could be widely used in an electronic equipment having limited inner space and thus could be widely promoted and applied in corresponding electronic equipments. Therefore, it could ease the transition from 4G to 5G.

No matter what the first antenna wire 2 and the second antenna wire 3 are used for, each of the first antenna wire 2 and the second antenna wire 3 could be a monopole antenna, an inverted-F antenna, a printed inverted-F antenna, or a loop antenna.

In an embodiment, the dimensions of the antenna array could be larger such that the antenna array could have a larger gain and lead a narrow wave beam to different angles. Specifically, the antenna array could be arranged to lead the narrow wave beam to different angles in at least two dimensions (such as a height or a position).

In an embodiment, the antenna array could be a modular phased antenna array. Please note, the phased antenna array is only an example, not a limitation of the present invention. In the actual implementation, the type of the antenna array could be determined according to the actual demands.

A low-pass filter could allow a signal having a frequency lower than the cutoff frequency to pass and block a signal having a frequency higher than cutoff frequency. In an embodiment, the filter 4 could be a low-pass filter 5. A high-pass filter, also called low cutoff filter, could allow a signal having a frequency higher than the cutoff frequency to pass and block a signal having a frequency lower than cutoff frequency. In another embodiment, the filter 4 could be a high-pass filter 6.

Figure 3:
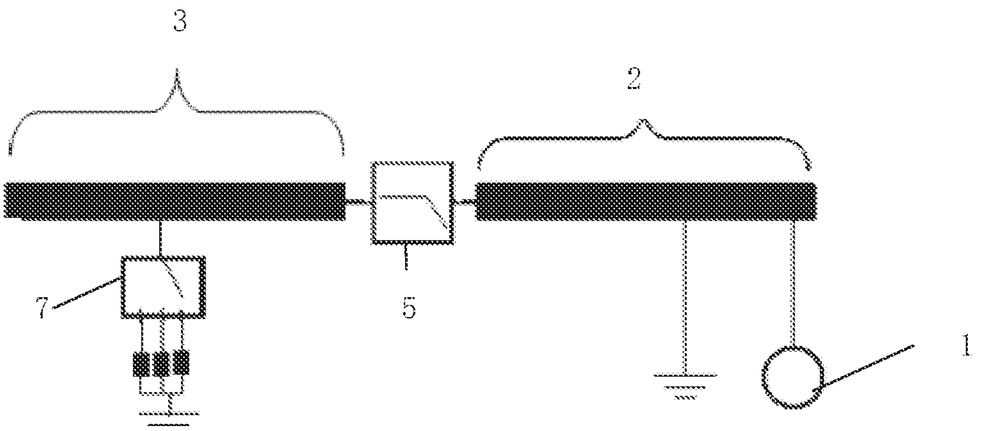
FIG. 3 is a diagram of an antenna array according to another embodiment of the present invention.

Please refer to FIG. 3. FIG. 3 is a diagram of an antenna array according to another embodiment of the present invention. The antenna array further comprises an antenna resonator 7. The antenna resonator 7 is electrically connected to the second antenna wire 3. In an embodiment, the filter 4 is the low-pass filter 5, the first frequency band comprises the second frequency band, and the second frequency band is lower than the third frequency band. In this embodiment, the first antenna wire 2 is an antenna coil and the radiator of the antenna coil is used to transmit signals. The antenna coil of the first antenna wire 2 is used to transmit the 4G signal as well as the 5G signal. That is, the first frequency band comprises the 4G frequency band and the 5G frequency band. As previously mentioned, the filter could allow signals corresponding to specific frequencies to pass and filter out some signals having different frequencies. The 4G frequency band is lower than 3 GHz and the 5G frequency band (N77/N78/N79) is often between 3 GHz-5 GHz. In an embodiment, the filter 4 is the low-pass filter 5 and only the signal having a frequency lower than 3 GHz could pass through the low-pass filter 5 and the other signals are filter out. That is, the low-pass filter 5 filters out the third frequency band (5G frequency band) from the first frequency band and only allows the second frequency band (4G frequency band) to pass. For the 5G high-frequency signal, because of the filter, the 5G high-frequency signal only exists on a portion of wire between the antenna feed point and the filter, which means only this portion of wire is the 5G antenna. When the low-frequency antenna is resonated by the antenna resonator, the low-frequency resonance is performed according to the actual demands but the high-frequency resonance is not influenced at all. This allows the second antenna wire 3 to work in the 4G frequency band and thus achieve the composite use of the 4G antenna and the 5G antenna.

Figure 4:
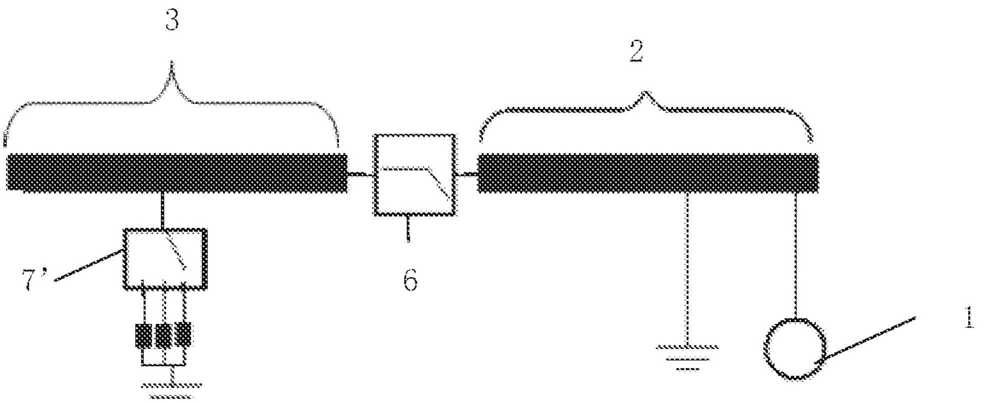
FIG. 4 is a diagram of an antenna array according to another embodiment of the present invention.

Please refer to FIG. 4. FIG. 4 is a diagram of an antenna array according to another embodiment of the present invention. The antenna array further comprises an antenna resonator 7'. The antenna resonator 7' is electrically connected to the second antenna wire 3. In this embodiment, the filter 4 is the high-pass filter 6, the first frequency band comprises a second frequency band, and the second frequency band is higher than the third frequency band. Furthermore, the first antenna wire 2 is an antenna coil and the radiator of the antenna coil is used to transmit signals. The antenna coil of the first antenna wire 2 is used to transmit the 4G signal as well as the 5G signal. That is, the first frequency band comprises the 4G frequency band and the 5G frequency band. As previously mentioned, the filter could allow signals corresponding to specific frequencies to pass and filter out some signals having different frequencies. The 4G frequency band is lower than 3 GHz and the 5G frequency band (N77/N78/N79) is often between 3 GHz-5 GHz. In this embodiment, the filter 4 is the high-pass filter 6 and only the signal having a frequency higher than 3 GHz could pass through the high-pass filter 6 and the other signals having the frequency lower than 3 GHz are filter out. That is, the high-pass filter 6 filters out the second frequency band (4G frequency band) from the first frequency band and only allows the third frequency band (5G frequency band) to pass. This allows the second antenna wire 3 to work in the 5G frequency band and thus achieve the composite use of the 4G antenna and the 5G antenna.

According to an embodiment of the present invention, a flexible printed circuit (FPC) is disclosed. The FPC comprises any of the above-mentioned antenna arrays in the above embodiments. The FPC is a highly reliable and good flexible printed circuit board, which is made by polyimide or polyester film. The FPC could have a high density of wires and a great flexibility and could be light and thin. In addition, FPC could support the 3D circuit design and thus could be incorporated with other electronic equipment designs to achieve different kinds of applications. Therefore, the FPC and the printed circuit board (PCB) are quite different. In contrast, PCB is often flat but FPC could sufficiently use a 3D space. As for the PCB, the conventional spatial expansion practice is to use the socket and the interface card. In contrast, the FPC could have a similar structure by conversion designs and have more flexibility in directional design.

According to an embodiment of the present invention, an electronic equipment is disclosed. The electronic equipment comprises the above-mentioned FPC. It could be understood that the electronic equipment comprises the above-mentioned FPC having the antenna array. Under the condition that the area of the antenna array has comparatively small change, the inner space in the electronic equipment could be guaranteed. This eases the installation of the inner devices and allows the electronic equipment to be smaller and thinner. Furthermore, the signal transmission and receiving capabilities of the electronic equipment have been expanded to process different types of signals. This could allow the communication system to be smoothly migrated from the previous generation to the new generation and provide a good user experience.

In an embodiment, the electronic equipment comprises the above-mentioned FPC circuit board, a radio frequency (RF) system and a battery. The RF system could comprise all kinds of circuit elements for executing the above-mentioned functions. In addition to the above antenna array, the RF system could further comprise RF transceiver, a digital signal processor, an encryption/decryption chip, a SIM card, a storage device, etc. The RF system could communicate with all kinds of network, such as internet, enterprise intranet, and/or wireless network, or with other equipments through the wireless network. The above-mentioned wireless network could comprise cell telephone network, wireless LAN, or Metropolitan Area Network. The above wireless network could use all kinds of communication standards, protocols and technologies, including but not limited to, GSM (Global System for Mobile Communication), EDGE (Enhanced Data GSM Environment), WCDMA (Wideband Code Division Multiple Access), CDMA (Code Division Access), TDMA (Time Division Multiple Access), Wi-Fi (Wireless Fidelity)(such as IEEE 802.11a, IEEE 802.11b, IEEE802.11g and/or IEEE 802.11n), VoIP (Voice over Internet Protocol), Wi-Max (Worldwide Interoperability for Microwave Access), other protocols for emails, instant communications and texts, and any other suitable communication protocols. It could use even those protocols that will be developed in the future. The above-mentioned circuit board comprises a main board positioned above the battery, a sub-board positioned below the battery, an RF processing circuit, and an RF transceiver. The RF transceiver is coupled to the RF processing circuit and the RF processing circuit is connected to the antenna array.

In an embodiment, the electronic equipment comprises a mobile terminal or a base station. The mobile terminal could be a 5G NR cell phone or any other 5G NR terminal equipment, such as CPE (Customer Premise Equipment) or MIFI (Mobile Wi-Fi). Specifically, if the electronic equipment is a cell phone, the cell phone comprises the above FPC circuit board, a storage device, an input unit, a display unit, a sensor, an audio circuit, a speaker, a microphone, a transmission module, a camera, a Bluetooth module, etc. Here, the storage device comprises a high-speed RAM and could comprise a non-volatile memory, such as a magnetic storage device, flash memory, or any other non-volatile solid storage device, for storing a software program and module. The input unit could be used to receive the inputted digital or alphabet information and generating input signals corresponding to the keyboard, the mouse, the joystick, the optical or track ball. The display unit could comprise a display panel, which could be implemented with a liquid crystal display (LCD) or an Organic Light-Emitting Diode (OLED) display, for displaying input/output information and any graphic user interfaces of the cell phone. The user interfaces could comprise pictures, texts, videos, icons or their combinations. The sensor could comprise an optical sensor, a motion sensor and/or any other sensors. The audio circuit could transform the received audio signal into an electrical signal and transfer the electrical signal to the speaker. The speaker is used to transform the audio data into an audio signal and output the audio signal. The microphone is used to transform the collected audio signal into an electrical signal. The audio circuit receives the electrical signal and transforms the electrical signal into audio data. The audio data are outputted to the processor to process and then transmitted by the RF system to another terminal. The transmission module (such as Wi-Fi module) could assist the user to send or receive emails, to browse websites, and to visit stream media. It provides the users with the wideband internet services. The processor is the control center of the cell phone and is connected to other components through the circuits and interfaces. The processor could execute or perform the software programs and/or modules stored in the storage device and load the data stored in the storage device to perform all kinds of functions or data processing to control the cell phone. In an embodiment, the processor could comprise one or more processing cores. In another embodiment, the processor could integrate an application processor and modulation/demodulation processor. Here, the application processor is used to deal with the operating system, the user interface and application procedure. The modulation/demodulation processor is used for wireless communication.

In an embodiment, the electronic equipment comprises a mobile terminal. The antenna array is placed on a top, a bottom or right/left sides of the mobile terminal. This could save the space of the mobile terminal and ease the promotion and application capability of the mobile terminal.

Above are embodiments of the present invention, which does not limit the scope of the present invention. Any modifications, equivalent replacements or improvements within the spirit and principles of the embodiment described above should be covered by the protected scope of the invention.

What is claimed is:

1. An antenna array, comprising:
an antenna feed point;
a filter, located within a predetermined distance range from the antenna feed point;
a first antenna wire, comprising a first terminal electrically connected to the antenna feed point, and a second terminal electrically connected to the filter; and
a second antenna wire, comprising a first end electrically connected to the first antenna wire through the filter, and a second end open-circuited;
wherein a working frequency band of the first antenna wire is a first frequency band; a working frequency band of the second antenna wire is a second frequency band; the filter is configured to filter out a third frequency band from the first frequency band and allow the second frequency band to pass through the filter.

2. The antenna array of claim 1, wherein the filter is a low-pass filter or a high-pass filter.

3. The antenna array of claim 2, further comprising:
an antenna resonator, electrically connected to the second antenna wire;
wherein the first frequency band comprises the second frequency band, the filter is the low-pass filter, and the second frequency band is lower than the third frequency band.

4. The antenna array of claim 3, wherein the second frequency band is a 4G frequency band and the third frequency band is a 5G frequency band.

5. The antenna array of claim 2, further comprising:
an antenna resonator, electrically connected to the second antenna wire;
wherein the first frequency band comprises the second frequency band, the filter is the high-pass filter, and the second frequency band is higher than the third frequency band.

6. The antenna array of claim 5, wherein the second frequency band is a 5G frequency band and the third frequency band is a 4G frequency band.

7. The antenna array of claim 1, wherein a type of the first antenna wire and the second antenna wire comprises a monopole antenna, an inverted-F antenna, a printed inverted-F antenna, or a loop antenna.

8. The antenna array of claim 1, wherein the antenna array is arranged to lead a narrow wave beam to different angles in at least two dimensions.

9. A flexible printed circuit, comprising:
an antenna feed point;
a filter, located within a predetermined distance range from the antenna feed point;
a first antenna wire, comprising a first terminal electrically connected to the antenna feed point, and a second terminal electrically connected to the filter; and
a second antenna wire, comprising a first end electrically connected to the first antenna wire through the filter, and a second end open-circuited;
wherein a working frequency band of the first antenna wire is a first frequency band; a working frequency band of the second antenna wire is a second frequency band; the filter is configured to filter out a third frequency band from the first frequency band and allow the second frequency band to pass through the filter.

10. The flexible printed circuit of claim 9, wherein the filter is a low-pass filter or a high-pass filter.

11. The flexible printed circuit of claim 10, further comprising:

an antenna resonator, electrically connected to the second antenna wire;

wherein the first frequency band comprises the second frequency band, the filter is the low-pass filter, and the second frequency band is lower than the third frequency band.

12. The flexible printed circuit of claim 11, wherein the second frequency band is a 4G frequency band and the third frequency band is a 5G frequency band.

13. The flexible printed circuit of claim 10, further comprising:

an antenna resonator, electrically connected to the second antenna wire;

wherein the first frequency band comprises the second frequency band, the filter is the high-pass filter, and the second frequency band is higher than the third frequency band.

14. The flexible printed circuit of claim 13, wherein the second frequency band is a 5G frequency band and the third frequency band is a 4G frequency band.

15. The flexible printed circuit of claim 9, wherein a type of the first antenna wire and the second antenna wire comprises a monopole antenna, an inverted-F antenna, a printed inverted-F antenna, or a loop antenna.

16. The flexible printed circuit of claim 9 being arranged to lead a narrow wave beam to different angles in at least two dimensions.

17. An electronic equipment, comprising an antenna array comprising:

an antenna feed point;

a filter, located within a predetermined distance range from the antenna feed point;

a first antenna wire, comprising a first terminal electrically connected to the antenna feed point, and a second terminal electrically connected to the filter; and a second antenna wire, comprising a first end electrically connected to the first antenna wire through the filter, and a second end open-circuited;

wherein a working frequency band of the first antenna wire is a first frequency band; a working frequency band of the second antenna wire is a second frequency band; the filter is configured to filter out a third frequency band from the first frequency band and allow the second frequency band to pass through the filter.

18. The electronic equipment of claim 17, wherein the filter is a low-pass filter or a high-pass filter.

19. The electronic equipment of claim 18 being a mobile terminal or a base station.

20. The electronic equipment of claim 19, wherein the electronic equipment is a mobile terminal and the antenna array is placed on a top, a bottom or right/left sides of the mobile terminal.

* * * * *